(12) United States Patent
Hwang et al.

(10) Patent No.: US 7,695,693 B2
(45) Date of Patent: Apr. 13, 2010

(54) THIN TYPE MICRO REFORMER

(75) Inventors: Won Jae Hwang, Seoul (KR); Sang Jin Kim, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 894 days.

(21) Appl. No.: 11/491,932

(22) Filed: Jul. 25, 2006

(65) Prior Publication Data

US 2007/0044380 A1    Mar. 1, 2007

(30) Foreign Application Priority Data

Aug. 24, 2005    (KR) .................... 10-2005-0077861

(51) Int. Cl.
*B01J 10/00*    (2006.01)
(52) U.S. Cl. .................. 422/189; 422/188; 422/190; 422/198; 422/193; 422/194; 422/199; 422/211; 422/213; 48/61; 48/127.9; 429/19; 429/20; 423/651; 423/648.1; 423/650; 423/655
(58) Field of Classification Search ............... 422/189, 422/188, 290, 198; 48/127.9, 61; 429/19–20
See application file for complete search history.

(56) References Cited

U.S. PATENT DOCUMENTS

| | | | |
|---|---|---|---|
| 7,563,417 B2 * | 7/2009 | Gil et al. .................... 422/189 |
| 2004/0244290 A1 | 12/2004 | Yamamoto et al. |
| 2005/0046007 A1 * | 3/2005 | Nakamura et al. .......... 257/686 |
| 2007/0077186 A1 * | 4/2007 | Gil et al. ..................... 422/189 |

FOREIGN PATENT DOCUMENTS

| DE | 197 54 012 C2 | 6/1999 |
|---|---|---|
| EP | 0 870 541 A2 | 3/1998 |
| EP | 1 637 222 A2 | 6/1998 |

(Continued)

OTHER PUBLICATIONS

German Office Action, issued in corresponding German Patent Application No. 10 2006 031 480.8-41, dated on Jul. 19, 2007.

(Continued)

*Primary Examiner*—Jennifer Michener
*Assistant Examiner*—Kaity V. Handal
(74) *Attorney, Agent, or Firm*—McDermott Will & Emery LLP (57) ABSTRACT

A thin type reformer for a fuel cell is provided, and includes a substrate, fuel filling portion, reformer portion, CO remover, and cover. The substrate forms a passage within. The fuel filling portion fills the passage with fuel. The reformer portion forms a passage to one side of the fuel filling portion in the substrate, and the CO remover forms a passage at an opposite side of the fuel filling portion in the substrate. The cover covers the top of the substrate and seals the passages. The fuel filling portion partitions the reformer portion's heat absorbing reaction and the CO remover's heat radiating reaction and induces a reforming reaction. The reacting efficiencies of the reformer portion and the CO remover substantially increase. Because a compact air supplying pump can be used due to an inner pressure reduction in the CO remover, the entire device can be miniaturized.

11 Claims, 7 Drawing Sheets

FOREIGN PATENT DOCUMENTS

| | | |
|---|---|---|
| JP | 2003-45459 | 2/2003 |
| JP | 2004-66008 | 3/2004 |
| JP | 2004-288573 | 10/2004 |
| KR | 10-2004-0069193 | 8/2004 |
| WO | WO 03/082460 A1 | 10/2003 |
| WO | WO 2004/037406 A1 | 5/2004 |

OTHER PUBLICATIONS

Korean Office Action issued in corresponding Korean Patent Application No. KR 10-2005-0077861, dated Aug. 29, 2006.

* cited by examiner

PRIOR ART

FIG. 1

PRIOR ART

FIG. 2

PRIOR ART

THIN TYPE MICRO REFORMER

RELATED APPLICATION

The present application is based on, and claims priority from, Korean Application Number 2005-77861 filed on Aug. 24, 2005, the disclosure of which is hereby incorporated by reference herein in its entirety.

BACKGROUND OF THE INVENTION

1. Field of the Invention

The present invention relates to a thin type micro reformer used in a fuel cell, and more particularly, to an improved thin type micro reformer having a fuel charger disposed between a reformer portion that reacts by absorbing heat and a CO remover that reacts by emitting heat, in order to partition the reformer portion and the CO remover. The reformer allows effective reforming response on a single sheet of substrate, an inner pressure inside the CO remover to decrease, and outside air to enter by means of a small pump.

2. Description of the Related Art

A recent increase in the use of mobile phones, PDAs, digital cameras, laptop computers, and other small, portable electronic devices—and especially, the beginning of DMB broadcasting for mobile phones—has given rise to a need for more effective power supplies for portable, compact terminals. Lithium ion rechargeable batteries used widely today provide power for only 2 hours of DMB viewing. While efforts are underway to enhance their performance, the fuel cell is viewed as an alternate solution to the above problem.

Methods of such fuel cells include direct methanol type fuel cells that supply methanol to fuel electrodes and reformed hydrogen fuel cells (RHFC) that extract hydrogen from methanol to supply to fuel electrodes. RHFC fuel cells use hydrogen as fuel, as in a polymer electrode membrane (PEM), and have the benefits of high output, power capacity available by volume unit, and no byproducts other than water. However, a reformer needs to be added to the system, making the device unsuitable for miniaturization.

To derive a high power output from such a fuel cell, a reformer is used to convert liquid fuel to hydrogen gas fuel. This type of reformer includes an evaporator for converting liquid methanol to a gaseous form, a reformer portion that converts methanol fuel to hydrogen through catalytic conversion at a temperature between 250° C. and 290° C., and a CO remover (or a PROX) that removes the byproduct carbon monoxide. Technology is needed to maintain the reformer portion (that reacts to absorb heat) at a temperature between 250° C. and 290° C., and the CO remover at a temperature between 170° C. and 200° C., in order to produce optimum reaction efficiency.

However, silicon, that has favorable heat conducting characteristics, is used as a substrate material and must be operated within a region that has been heat insulated to prevent heat leakage to the outside. Thus it is difficult for the temperature on one substrate to be maintained in two other separate regions, and a configuration allowing for this is required.

Figure 1:
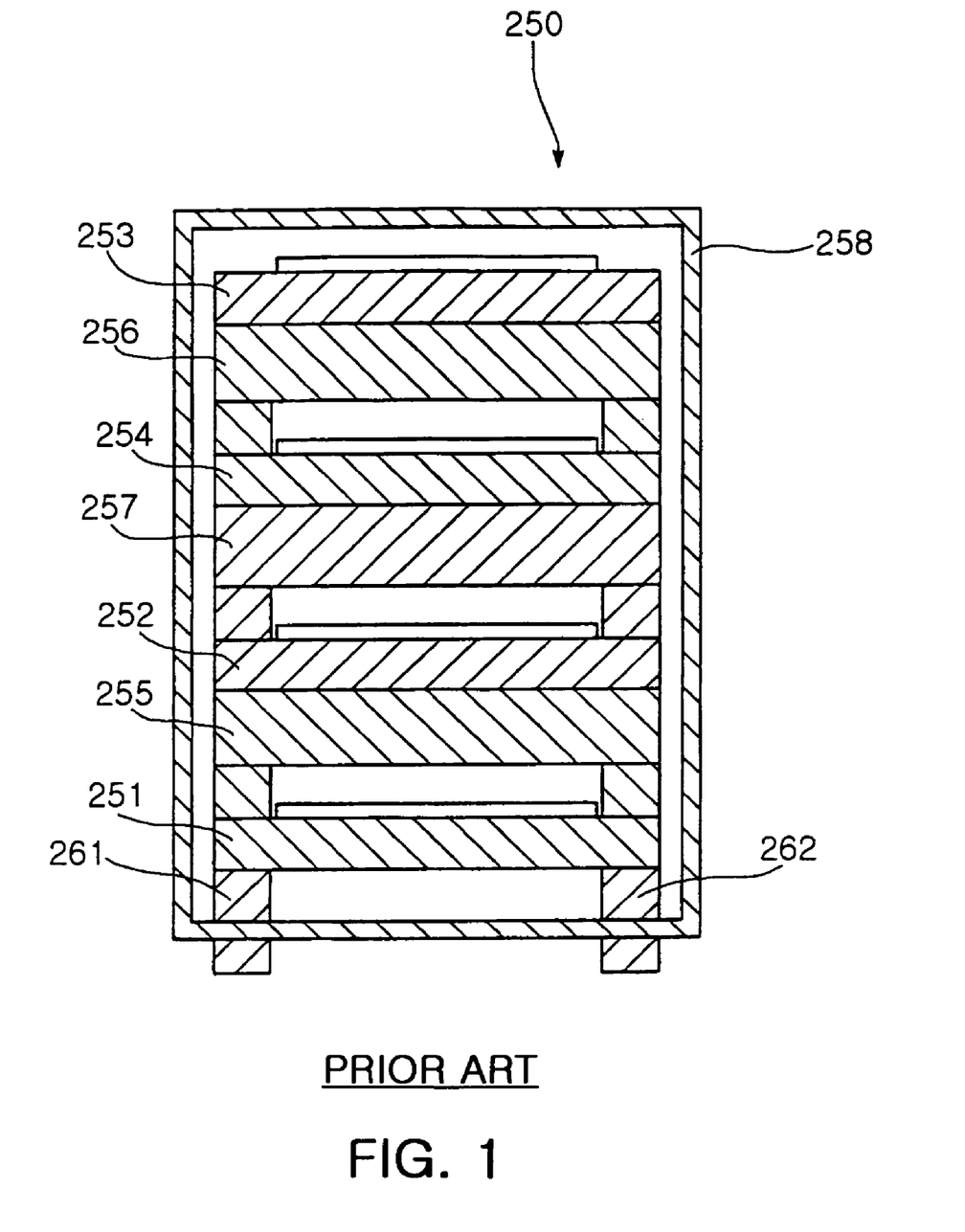
FIG. 1 is a sectional view of a reformer according to the related art.

As shown in FIG. 1, a conventional compact reformer 250 is disclosed in Japanese Patent No. 2004-288573, which is hereby incorporated by reference. This conventional compact reformer 250 includes a heat insulating package 258 and combustion fuel evaporator 251, a generator fuel evaporator 255, a burner 252, a CO remover 257, another burner 254, a reformer portion 256, and yet another burner 253, sequentially stacked within the heat insulating package 258.

Heat insulated supports 261 and 262 are installed below the combustion fuel evaporator 251 to support the combustion fuel evaporator 251. The combustion fuel evaporator 251 is separated from the inner walls of the heat insulating package 258. Accordingly, because this conventional reformer has a multi-layer structure, it is difficult to make compact.

Figure 2:
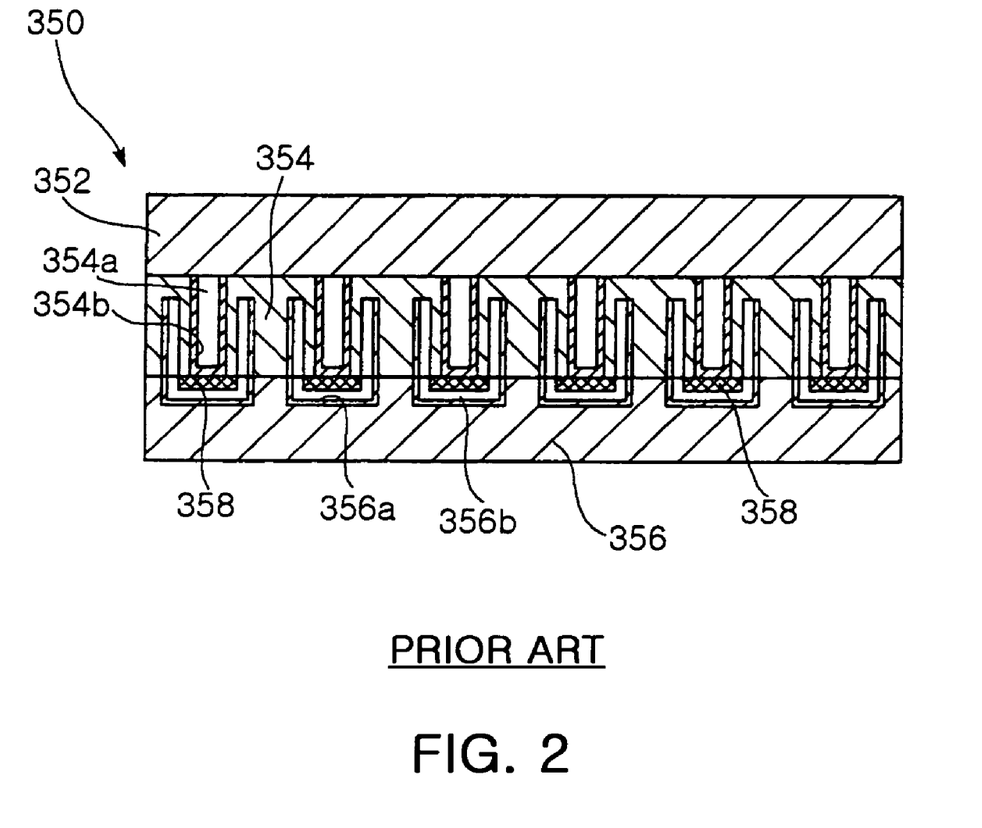
FIG. 2 is a sectional view of an alternately structured reformer according to the related art.

Another conventional compact reformer 350 is shown in FIG. 2 and is disclosed in Japanese Patent No. 2003-45459, which is hereby incorporated by reference. This conventional reformer includes a first substrate 352 forming a flat cover, a second substrate 354 forming passages 354a on one side thereof and having a catalytic layer 354b formed within, and a third substrate 356 having a heat insulating cavity 356b with a mirror surface 356a formed therein. A reformer portion is formed through the passage 354a of the second substrate 354 and has the catalytic layer 354b that produces hydrogen gas and $CO_2$ from methanol and water, and a thin film heater 358 is provided underneath the catalytic layer 354b along the reformer portion.

Although the provision of the heater 358 within the passages of the above conventional reformer raises heat efficiency, the structure is complex and is therefore difficult to make, and the catalytic layer 354b is limited to one portion, reducing reforming efficiency.

Figure 3:
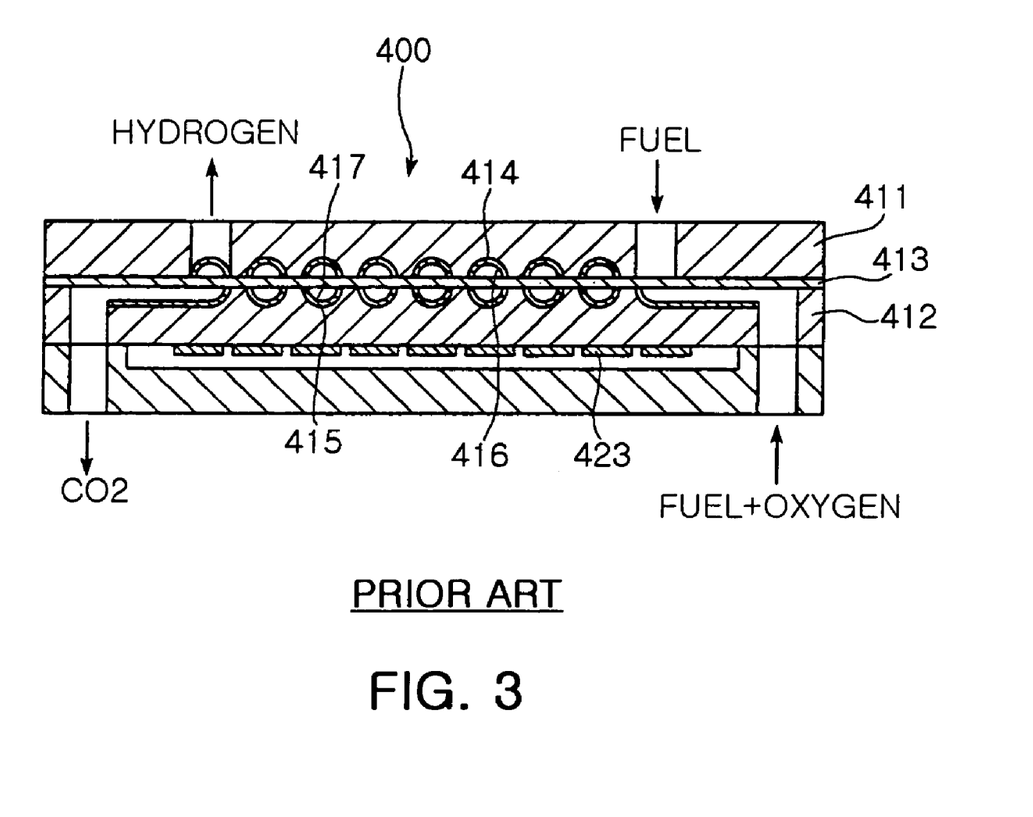
FIG. 3 is a sectional view of a reformer with yet another structure according to the related art.

A further conventional compact reformer 400 is shown in FIG. 3 and is disclosed in Japanese Patent No. 2004-066008, which is hereby incorporated by reference. This conventional technology provides a highly heat conductive aluminum heat conducting portion 413 (for very efficient heat conducting) between two substrates 411 and 412, and a reactive catalytic layer 416 within the fine passage 414 formed in the inner surface of the main substrate 411.

A combustion catalytic layer 417 is provided in a fine passage 415 formed in the inner surface of the combustion substrate 412, and a thin film heater 423 is provided on the outer surface of the combustion substrate 412.

Combustible fuel supplied within the passage 415 is combusted through the combustion reaction on the combustion catalytic layer 417. The heat energy produced through the combustion and the energy from the heating of the thin film heater 423 combine to heat the inside of the passage 414.

Accordingly, loss of heat energy supplied to the reactive catalytic layer 416 installed inside the passages 414 and 415 of the substrates 411 and 412 is reduced.

However, in the above-described conventional structures, at least 3 thin films are stacked, forming a large reformer. Also, in order to supply air into the CO remover that has a high inner pressure, a large-sized air supplying pump must be used to supply pressurized air. Thus, miniaturization of components required by the reformer is problematic.

SUMMARY OF THE INVENTION

Accordingly, the present invention is directed to a thin type reformer that substantially obviates one or more problems due to limitations and disadvantages of the related art.

An object of the present invention is to provide a thin type reformer that is formed thinly in its entirety so that it can be conveniently used in a fuel cell, etc.

Another object of the present invention is to provide an improved thin type reformer that induces a drop in interior pressure of a CO remover so that a small-sized air supplying pump can be used, miniaturizing the entire device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a thin type reformer used for a fuel cell, including: a substrate forming a passage within; a fuel filling portion for filling the passage with fuel; a reformer portion forming a passage at one side of the fuel filling portion in the substrate, for reforming the fuel to hydrogen gas through a heat absorbing reaction; a CO remover forming a passage at an opposite side of the fuel filling portion in the substrate, for removing CO gas included in the hydrogen gas from the hydrogen gas through a heat radiating reaction; and a cover for covering an upper portion of the substrate and sealing the passages from an outside, wherein the fuel filling portion partitions the heat absorbing reaction of the reformer portion and the heat radiating reaction of the CO remover and induces a reforming reaction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 shows the structure of a thin type reformer according to an embodiment of the present invention, where 5a is a plan view, 5b is a sectional view taken along line A-A in 5a, and 5c is a sectional view taken along line B-B in 5a;

FIG. 6 shows the structure of a thin type reformer according to another embodiment of the present invention, where FIG. 6(a) is a plan view, FIG. 6(b) is a sectional view taken along line C-C in FIG. 6(a), and FIG. 6(c) is a sectional view taken along line D-D in FIG. 6(a)

DETAILED DESCRIPTION OF THE INVENTION

Reference will now be made in detail to the preferred embodiments of the present invention, examples of which are illustrated in the accompanying drawings.

Figure 4:
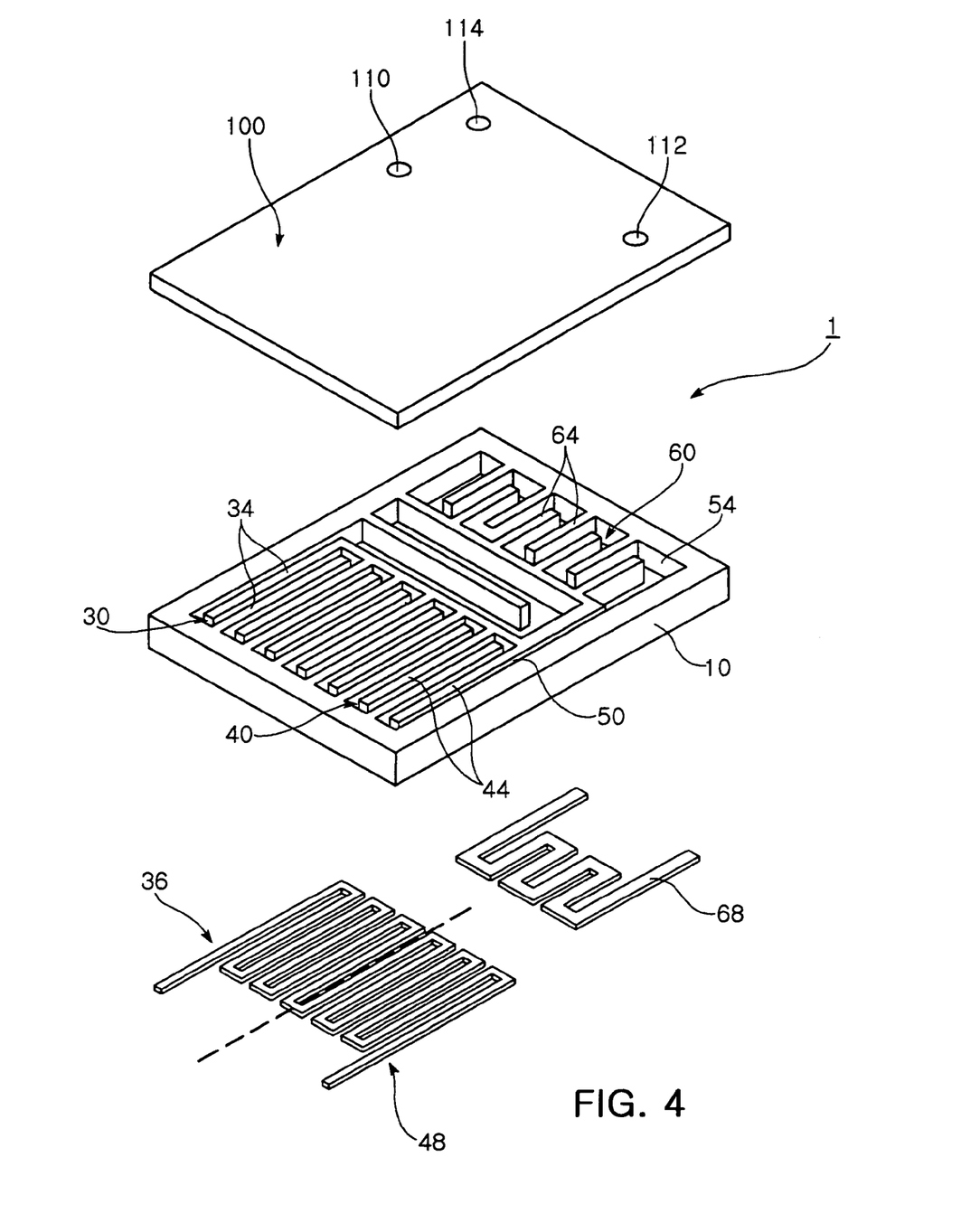
FIG. 4 is an exploded perspective view of a thin type reformer according to the present invention.

As shown in FIG. 4, a thin type reformer 1 according to an embodiment of the present invention includes a substrate 10 forming a passage within. The substrate 10 may use silicon, metal, glass, ceramic, and heat resistant plastic, and indented passages are formed through etching into one side of the substrate 10.

That is, etching is performed on one side of the substrate 10, forming a desired configuration of indented passages.

Figure 5:
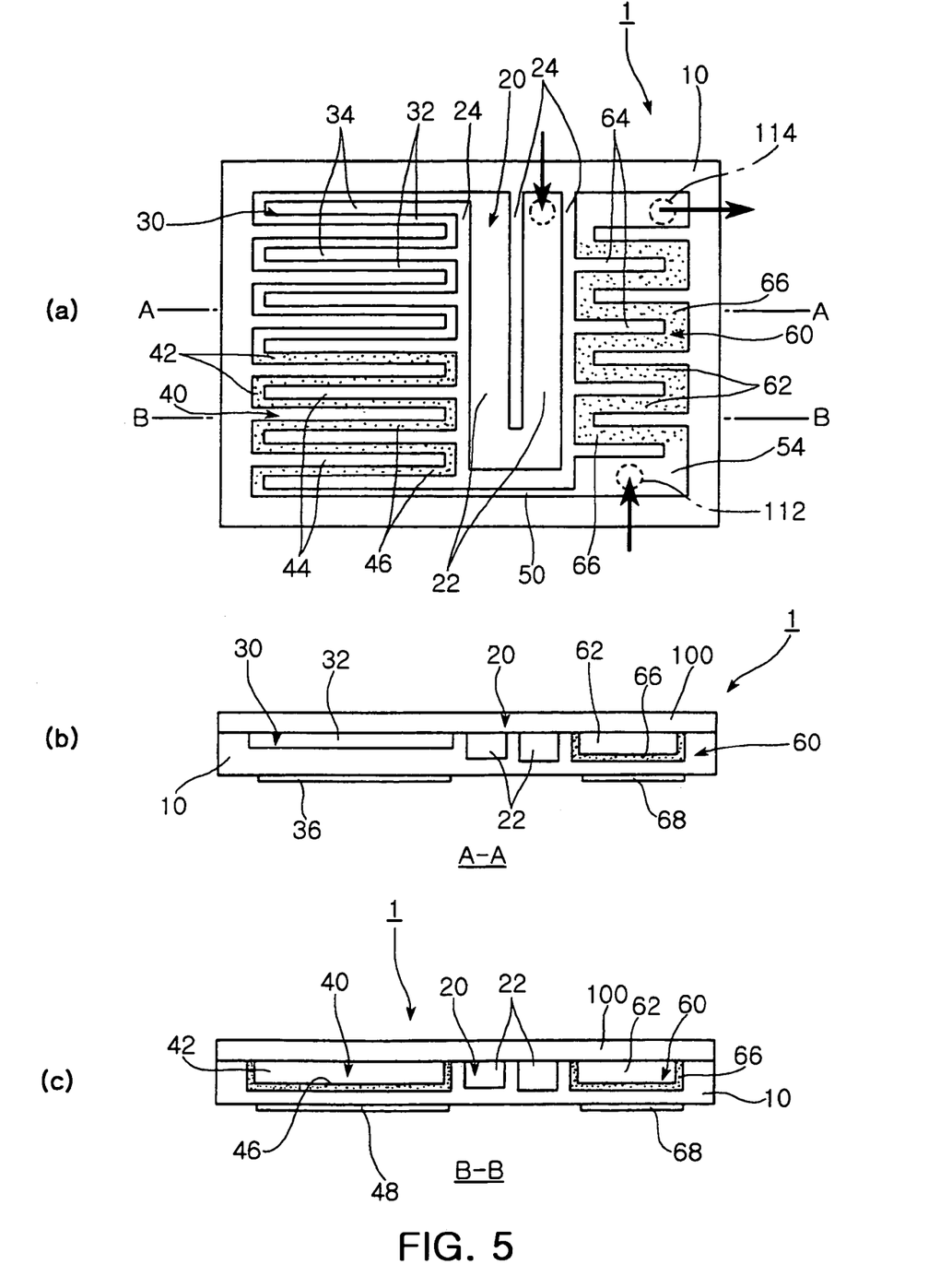

A fuel filling portion 20 is provided to fill the insides of the passages of the substrate 10 with fuel. The fuel filling portion 20, as shown in FIGS. 4 and 5, is formed at an approximate central location of the substrate 10. The passage 22 of the fuel filling portion 20 is formed to proceed from one edge of the substrate 10 to the opposite edge of the substrate 10 by a plurality of partitioning walls 24 also extending from the one end to the other of the substrate 10. After thus extending in one direction, the passage 22 is formed to proceed in the opposite direction.

To fill liquid fuel (methanol) in the fuel filling portion 20, a fuel filling hole 110 is formed in the cover 100 covering the top of the substrate 10, so that the liquid fuel may be filled into the fuel filling portion 20.

At the exit end of the fuel filling portion 20, an evaporator 30, for heating the liquid fuel and converting it to a gaseous form, is formed. The evaporator 30 vaporizes liquid fuel so that it is in an optimum condition for reforming. A plurality of partitioning walls 34, for forming a serpentine passage 32 of the evaporator 30, do not need to have catalysts formed therein.

Figure 7:
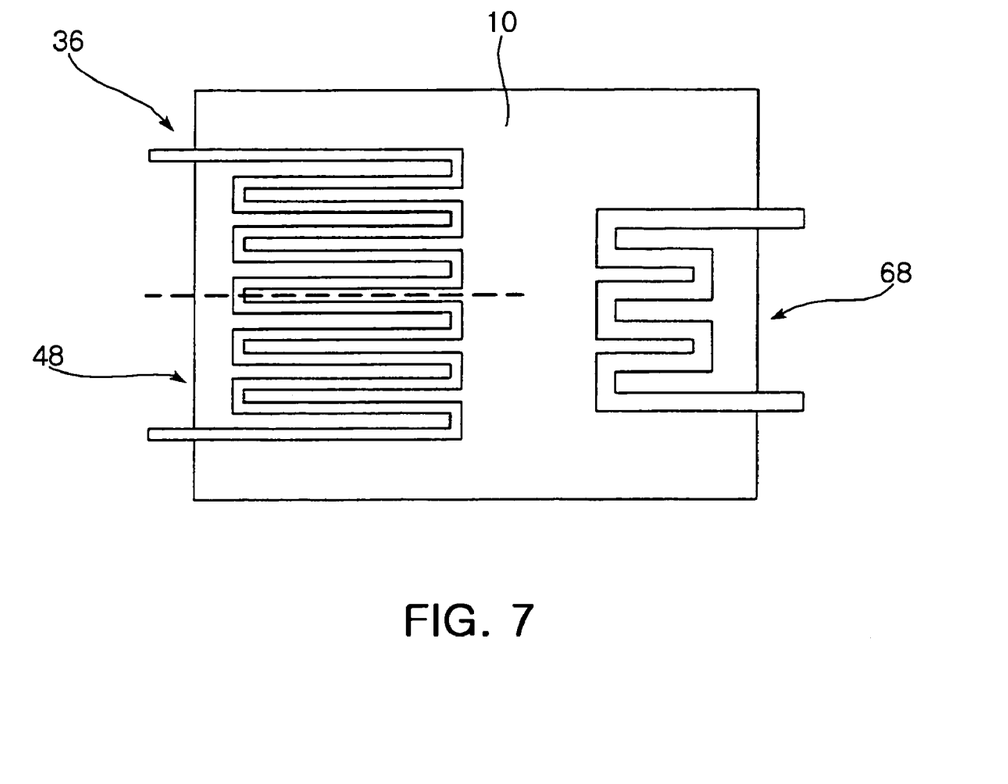
FIG. 7 is a plan view showing a heating member of a thin type reformer according to the present invention forming an electrical resistance circuit pattern on the bottom surface of a substrate.

However, the evaporator 30, being a heat source, includes a heating member 36 that is formed in an electrically resistant circuit pattern at the bottom surface of the substrate 10 to heat the evaporator 30 on the upper surface of the substrate 10 through the substrate 10.

Also, in the inventive reformer, a passage 42 through which the fuel flows is formed within the substrate 10 at the downstream end of the evaporator 30, and a reformer portion 40 is formed to reform the fuel into hydrogen gas through heat absorption reacting. The reformer portion 40 is biased to one side of the substrate 10 and formed at the downstream end of the evaporator 30, and the passage 42 is connected to the passage 32 of the evaporator 30. Partitioning walls 44 are formed to form the passage 42 of the reformer portion 40 in the same serpentine shape as the passage 32 of the evaporator 30.

Thus, the passages 32 and 42 of the evaporator 30 and the reformer portion 40 are formed in a serpentine zigzagging shape along the entire length of the passage 22 of the fuel filling portion 20 to one side thereof, are formed with a plurality of partitioning walls 34 and 44, and include a catalyst 46 for reforming the fuel inside the passage 42 of the evaporator 40 to gaseous hydrogen. Hydrogen is converted to an abundance of reformed gas through catalytic reaction of fuel in the reformer portion 40. As a catalyst 46 of the reformer portion 40, Cu/ZnO or $Cu/ZnO/Al_2O_3$ is used. The catalyst 46 may be mounted to the partitioning walls 44 forming the passage 42.

The reformer portion 40 reforms methanol or other hydrocarbon fuels to hydrogen gas through catalytic conversion accompanying heat absorption. A heat source that is needed for this process takes the form of a heating member 48 formed at the bottom of the substrate 10. The heating member 48 of the reformer portion 40 is formed in a pattern of an electrically resistant circuit at the bottom surface of the substrate 10, and heats the reformer portion 40 at the top of the substrate 10 through the substrate 10. The heating member 48 of the reformer portion 40 may be integrally formed in a single electrically resistant circuit pattern with the heating member 36 of the evaporator 30.

Likewise, the heating member 48 of the reformer portion 40 is formed on the lower surface of the substrate 10, and maintains the reformer portion 40 through the substrate 10 at a predetermined temperature, preferably between 250-290° C.

Also, a CO remover 60 is formed at the downstream end of the reformer portion 40 of the substrate 10 in the present invention, and removes CO from the reformed gas generated by the reformer portion 40.

The CO remover 60 forms a passage on the opposite end of the fuel filling portion 20 inside the substrate 10, and removes CO gas included in the hydrogen gas through heat emitting reaction.

The reformer portion 40 supplies reformed gas including hydrogen gas, carbon monoxide, and carbon dioxide to the CO remover 60, which is supplied through a narrower connecting portion 50 at the end of the passage. The connecting portion 50 extends along the edge of the substrate 10, and a passage expanded portion 54 having a larger passage size than that of the connecting portion 50 is provided at the entrance of the CO remover 60.

The reformed gas including hydrogen gas, carbon monoxide, and carbon dioxide first passes through the narrower connecting portion 50 and is then discharged into the more expansive passage expanded portion 54, leading to a decrease in pressure as it flows toward the CO remover 60.

The CO remover 60 forms a passage 62 through a plurality of partitioning walls 64 of the evaporator 30 and the reformer portion 40. At the entrance end of the passage 62, or the passage expanded portion 54, an air entry hole 112 is formed in the cover 100 covering the top of the substrate 10.

A catalyst 66 for removing the CO gas produced by the reformer portion 40 is coated inside the passage 62.

When the reformed gas that enters the CO remover 60 and reacts with oxygen to remove CO, the catalyst used in the CO remover 60 may be one of Pt, Pt/Ru, and $Cu/CeO/Al_2O_3$.

The CO remover 60 converts CO (that is harmful to humans) to $CO_2$ (that is not harmful to humans) through catalytic conversion accompanying heat emitting reaction. A heat source needed for this process is a heating member 68 for the CO remover 60, the heat source formed on the bottom surface of the substrate 10.

The heating member 68 of the CO remover 60 is patterned on the bottom of the substrate 10 in the form of an electrically resistant circuit pattern, and heats the CO remover 60 on top of the substrate 10 through the substrate 10.

This heating member 68 of the CO remover 60 is formed in an electrically resistant circuit pattern, and maintains the CO remover 60 at a predetermined temperature of preferably 170-200° C. through an adequate power supply and control thereof.

Also included in the present invention is the cover 100 that covers the top of the substrate 10 and seals the inner passages 22, 32, 42, and 62 from the outside. The cover 100 may use the same materials as the substrate 10, for example, silicon, metal, glass, ceramic, and heat resistant plastic, and may be integrated by being bonded to the top surface of the substrate 10.

This cover 100 may form recessed passages corresponding to the passages 22, 32, 42, and 62 of the fuel filling portion 20, the evaporator 30, the reform portion 40, and the CO remover 60, so that inner volume of the passages formed by the substrate 10 and the cover 100 can be expanded.

When bonded integrally to the substrate 10, the cover 100 forms a reformed gas exhaust port 114 near the exit of the passage 62 of the CO remover 60. That is, reformed gas including hydrogen gas and $CO_2$ is exhausted from the CO remover 60 to the outside of the substrate 10.

Accordingly, the cover 100 forms the fuel filling hole 110 at the fuel filling portion 20, the air entry hole at the passage expanded portion 54 at the entrance of the CO remover 60, and the reformed gas exhaust port 114 at the exit end of the CO remover 60, so that liquid fuel is reformed into reformed gas including hydrogen and $CO_2$ that is exhausted.

The thin type reformer 1 according to present invention fills liquid fuel through the fuel filling hole 110 to pass through the fuel filling portion 20 into the inner passage 22 formed by the substrate 10 and the cover 100. Because this liquid fuel flows through roughly the central portion of the substrate 10, it partitions the reformer portion 40 provided at one side of the substrate 10 and the CO remover 60 provided at the other side.

This liquid fuel that passes through the fuel filling portion 20 enters the evaporator 30 and is vaporized at the temperature necessary for reforming, 250-290° C.

Then, the evaporated fuel enters the reformer portion 40 formed at the downstream end of the evaporator 30, and undergoes catalytic conversion accompanying heat absorption at a temperature of 250-290° C., where reformed gas including hydrogen gas, CO, and $CO_2$ is generated.

This reformed gas passes through the narrow connecting portion 50 of the passage and flows downstream to the CO remover 60. During this process, high temperature, high pressure reformed gas passes through the narrow connecting portion 50 and depressurizes when it enters the suddenly widened passage expanded portion 54 of the CO remover 60, so that pressure of gas in the passage expanded portion 54 is substantially lower than in the reformer portion 40.

Then, the reformed gas passes through the air entry hole of the cover 100 over the passage expanded portion 54, passing through the CO remover 60 while air is entering.

Heat radiation occurs in the CO remover 60 at a temperature of 170-200° C., along with catalytic conversion of selective oxidization, converting CO to $CO_2$ in the reformed gas, so that it will be harmless to humans.

In this state, reformed gas including hydrogen gas and the $CO_2$ is created while passing through the CO remover 60, and the reformed gas is exhausted through the reformed gas exhaust port 114 in the cover 100.

The fuel filling portion 20, through which liquid methanol fuel at room temperature is filled in the above process, is formed in the middle of the reformer portion 40 and the CO remover 60 in the present invention. Because a separate heater or catalyst heater is not installed, the 250-290° C. heat conducted from the reformer portion 40 and the 170-200° C. heat conducted from the CO remover 60 is absorbed by the liquid fuel. Thus, the fuel filling portion 20 can clearly divide the temperatures of the reformer portion 40 and the CO remover 60.

Air needed for the oxidization in the CO remover 60 must be supplied from the outside; and in this case, a pump (not shown) for supplying air through the air entry hole 112 in the cover 100 may be a small-capacity compact pump. That is, because reformed gas moves from the reformer portion 40 through the connecting portion 50 with a small cross-sectional area to the passage expanded portion 54 of the CO remover 60, the drop in inner pressure at the passage expanded portion 54 causes the pressure in the passage expanded portion 54 to be substantially lower than the pressure in the reformer portion 40, so that outside air can easily enter through the air entry hole 112.

Accordingly, the pump that supplies air to the air entry hole 112 may be smaller compared to those in the related art.

Figure 6:
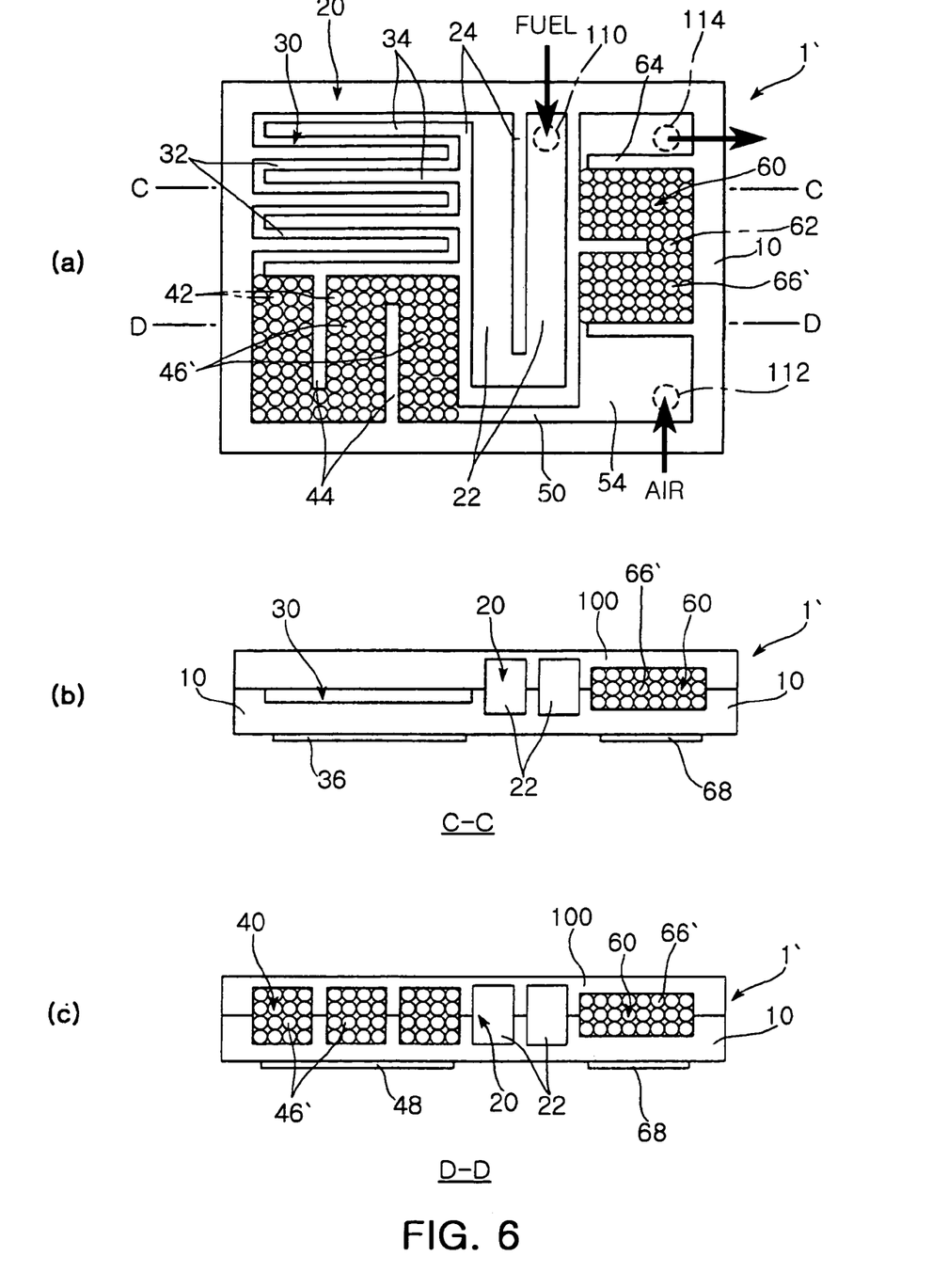

FIG. 6 shows the structure of a thin type reformer 1' according to another embodiment of the present invention.

This thin type reformer 1' according to the alternate embodiment, when compared to the thin type reformer 1 shown in FIG. 5, has enlarged passages 42 and 62 of the reformer portion 40 and the CO remover 60. Also the catalysts 46' and 66' of the reformer portion 40 and the CO remover 60 are not formed by coating, etc. on the partitioning walls 44 and 64 of the passage 42 and 62, but are filled with particles, between which the fuel and gases flow.

Specifically, particles made of $Cu/ZnO$ or $Cu/ZnO/Al_2O_3$ for the catalyst 46' in the reformer portion 40 may be filled inside the passage 42 of the reformer portion 40.

Here, the particles may be formed of a size that prevents them from exiting through the evaporator 30 at the front of the reformer portion 40 or the connecting portion 50 at the rear of the reformer portion 40.

Also, the catalyst 66' used in the CO remover 60 may take the form of particles formed of one of Pt, Pt/Ru, and $Cu/CeO/Al_2O_3$.

The catalyst particles 66' in the CO remover may be formed in a size preventing them from exiting from the passage expanded portion 54 at the entrance of the CO remover 60 or the reformed gas exhaust hole 114 at the exit of the CO remover 60.

Also, the cover 100 that is bonded to and covers the substrate 10 may form recessed passages corresponding to the passages 22, 32, 42, and 62 of the fuel filling portion 20, the evaporator 30, the reformer 40, and the CO remover 60, so that the interior volume of the passages 22, 32, 42, and 62 formed by the substrate 10 and cover 100 is expanded.

In the thin type reformer 1' according to the alternate embodiment of the present invention, the hot and high-pressured reformed gas is transferred from the narrow connecting portion 50 connecting the reformer portion 40 and the CO remover 60 to the passage expanded portion 54 to effectively reduce the pressure. Therefore, the capacity of the pump supplying air to the air entry hole 112 does not need to be large in this embodiment, and can be a compact pump.

Compared to the thin type reformer 1 shown in FIGS. 4 and 5, the thin type reformer 1' according to the alternate embodiment of the present invention is generally the same in terms of materials for the substrate 10 and the positions of the fuel filling portion 20, the evaporator 30, the reformer portion 40, the CO remover 60, and the heating members, so that the two reformers have similar functions.

Although the thin type reformer 1' according to the alternate embodiment of the present invention is different from the thin type reformer 1 shown in FIGS. 4 and 5, the particles allow more freedom in the placement or shapes of the catalysts 46' and 66', and thus a simpler forming thereof.

The thin type reformer according to the present invention provides a fuel filling portion between a reformer portion and a CO remover on a single substrate, to block heat between the reformer portion and the CO remover, creating 2 separate temperature regions and increasing the reaction efficiencies for each respective region.

Also, the substrate in which passages are formed and a cover covering the passages allow fuel filling, evaporating, reforming, and CO removal to be sequentially performed on a single surface of the substrate, allowing a low profile of the reformer.

Furthermore, the reformed gas moving from the reforming portion to the CO remover moves from a portion of a passage with a small sectional area to a passage expanded portion with a larger sectional area, so that the inner pressure of the CO remover in the passage expanded portion is reduced, allowing the use of a small-sized air supplying pump. The total volume required by the reformer can therefore be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A thin type reformer used for a fuel cell, comprising:
a substrate forming a passage within;
a fuel filling portion for filling the passage with fuel;
a reformer portion forming a passage at one side of the fuel filling portion in the substrate, for reforming the fuel to hydrogen gas through a heat absorbing reaction;
a CO remover forming a passage at an opposite side of the fuel filling portion in the substrate, for removing CO gas included in the hydrogen gas from the hydrogen gas through a heat radiating reaction; and
a cover for covering an upper portion of the substrate and sealing the passages from an outside, wherein the fuel filling portion partitions the heat absorbing reaction of the reformer portion and the heat radiating reaction of the CO remover and induces a reforming reaction; and
wherein the fuel filling portion is formed in an approximate center of the substrate, and includes a plurality of partitioning walls forming a passage from one edge to an opposite edge of the substrate and inducing liquid fuel to flow from the one edge of the substrate to the opposite edge of the substrate and then flow in an opposite direction.

2. The reformer of claim 1, wherein the reformer portion is connected to a passage expanded portion of the CO remover through a connecting portion having a smaller sectional area than that of the passage expanded portion.

3. The reformer of claim 1, further comprising an evaporator formed between an exit end of the fuel filling portion and the reformer portion, the evaporator for heating and evaporating liquid fuel and being heated by a heating member formed on a lower surface of the substrate.

4. The reformer of claim 3, wherein the evaporator includes a plurality of partitioning walls forming a serpentine passage.

5. The reformer of claim 3, wherein the passage of the reformer portion is formed in a serpentine shape similar to the evaporator, and includes a catalyst of $Cu/ZnO$ or $Cu/ZnO/Al_2O_3$ formed on the partitioning walls thereof.

6. The reformer of claim 3, wherein the passage of the reformer portion is formed in a serpentine shape larger and different than that of the evaporator, and includes particulate catalysts formed of $Cu/ZnO$ or $Cu/ZnO/Al_2O_3$ filled therein.

7. The reformer of claim 5 or 6, wherein the heating member of the reformer portion is formed in an electrically resistant circuit pattern on a bottom surface of the substrate and heats the reformer portion above the substrate through the substrate.

8. The reformer of claim 1, wherein the CO remover forms a passage through a plurality of partitioning walls, the partitioning walls being coated with catalysts formed of one of Pt, Pt/Ru, and $Cu/CeO/Al_2O_3$.

9. The reformer of claim 1, wherein the CO remover forms a passage through a plurality of partitioning walls, and the passage formed by the CO remover is filled with particulate catalysts formed of one of Pt, Pt/Ru, and $Cu/CeO/Al_2O_3$.

10. The reformer of claim 8 or 9, wherein the heating member of the CO remover is formed in an electrically resistant circuit pattern on a lower surface of the substrate, and heats the CO remover through the substrate.

11. The reformer of claim 1 or 2, wherein the cover forms recessed passages corresponding to the passages of the fuel filling portion, the evaporator, the reformer portion, and the CO remover, the recessed passages increasing an inner volume of the passages formed by the substrate and the cover.

* * * * *